(No Model.) 2 Sheets—Sheet 2.

H. F. JONES.
COMBINED ROLLER AND DRILL.

No. 436,664. Patented Sept. 16, 1890.

WITNESSES:
Donn Twitchell
E. M. Clark

INVENTOR:
H. F. Jones
BY
Munn & Co.
ATTORNEYS

UNITED STATES PATENT OFFICE.

HARVEY F. JONES, OF CARLYLE, ILLINOIS.

COMBINED ROLLER AND DRILL.

SPECIFICATION forming part of Letters Patent No. 436,664, dated September 16, 1890.

Application filed June 2, 1890. Serial No. 354,001. (No model.)

*To all whom it may concern:*

Be it known that I, HARVEY F. JONES, of Carlyle, in the county of Clinton and State of Illinois, have invented a new and useful Improvement in a Combined Roller and Drill, of which the following is a full, clear, and exact description.

My invention relates to a combined roller and drill, and has for its object to provide an implement of simple and durable construction, which will sow a maximum amount of seed with a minimum of draft, pulverize the ground although exceedingly rough, create furrows in the ground for the reception of seed, cover the seed, and pack the earth thereon.

A further object of the invention is to provide an implement which will not gather trash, and which will also work effectually even when drawn crosswise of the furrows.

The invention consists in the novel construction and combinations of the several parts, as will be hereinafter fully set forth, and pointed out in the claims.

Reference is to be had to the accompanying drawings, forming a part of this specification, in which similar figures and letters of reference indicate corresponding parts in all the views.

Figure 1:
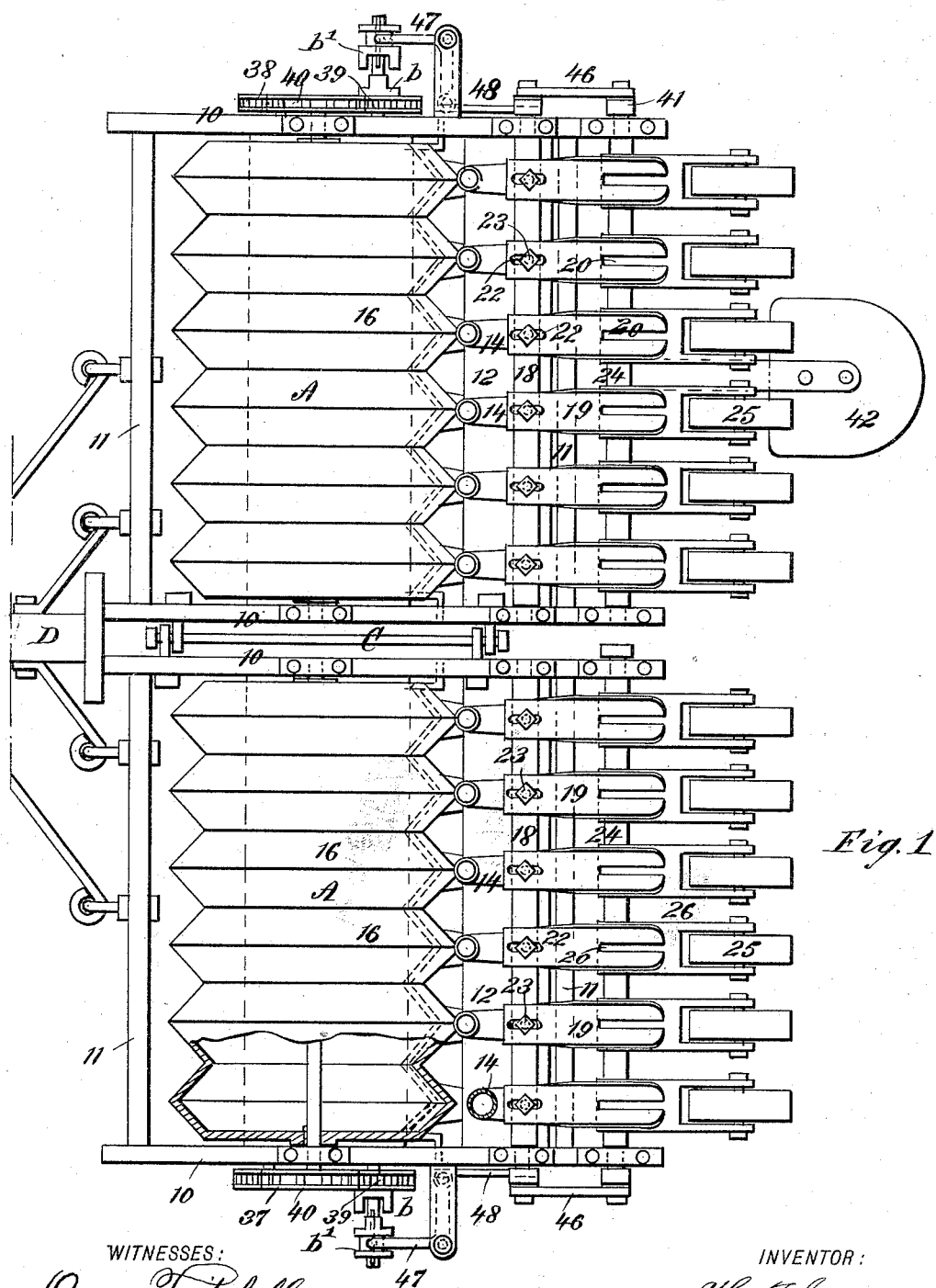
Figure 2:
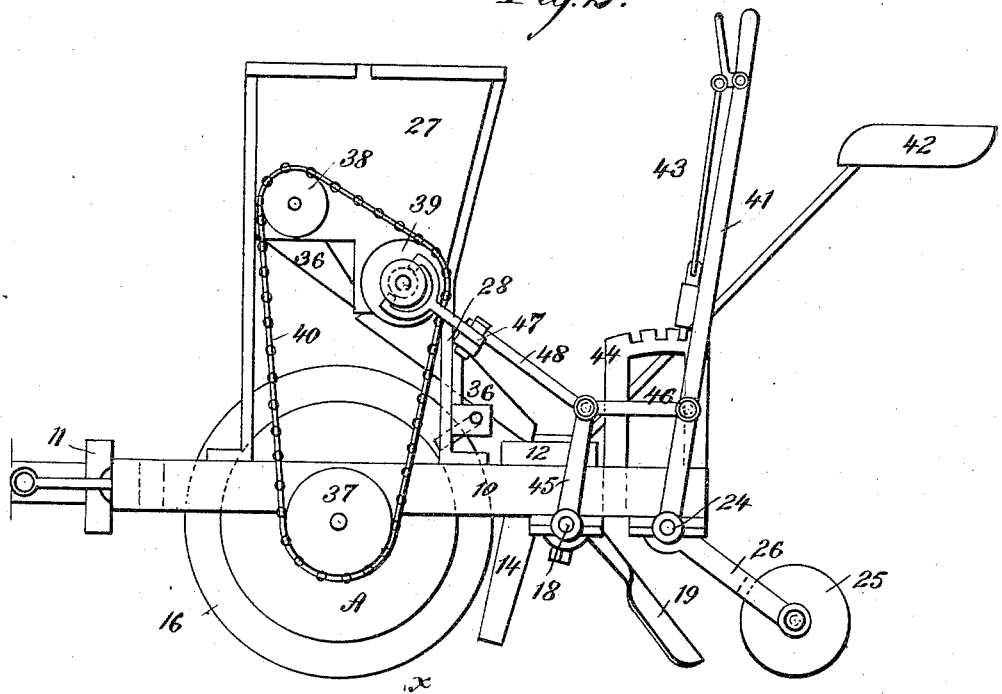
Figures 3, 4:
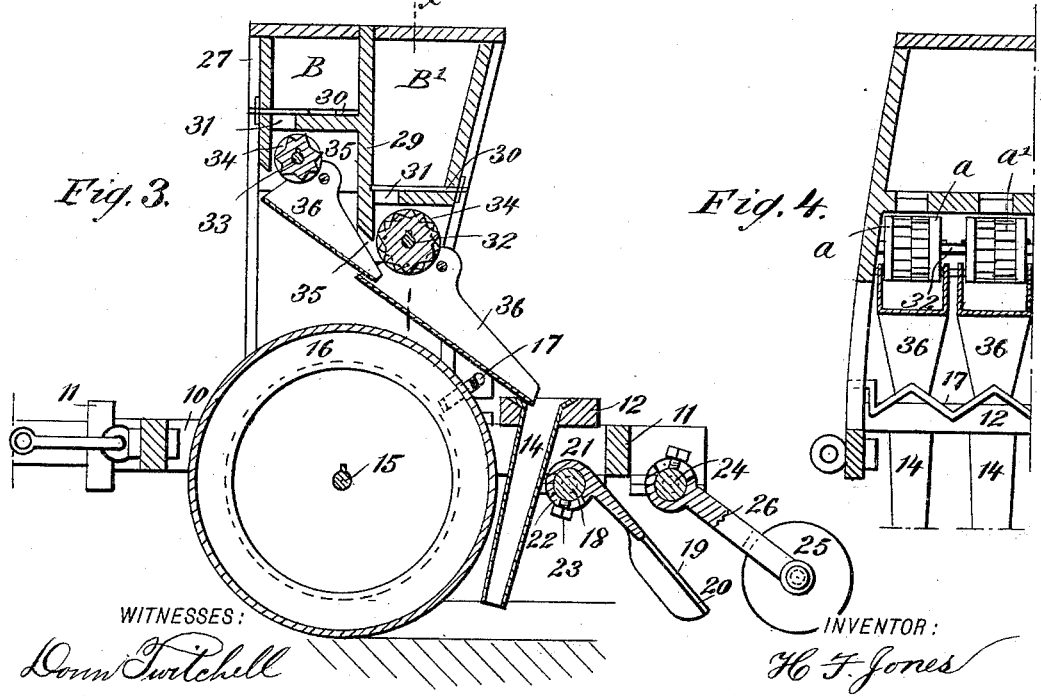

Figure 1 is a bottom plan view of the implement, a portion of the roller being in section. Fig. 2 is an end view of the implement. Fig. 3 is a vertical section thereof; and Fig. 4 is a partial longitudinal vertical section, taken at the rear of the drum, on the line *x x* in Fig. 3.

The frame is preferably rectangular, and consists, primarily, of side beams 10 and front and rear cross-beams 11, the former being usually made to extend beyond the latter. The frame near the rear has secured thereto a transverse sill 12, provided with a series of longitudinal apertures, preferably countersunk at their outer ends, into each of which apertures a drill 14 is introduced, each drill consisting of a tube downwardly projected and forwardly inclined, having a flaring upper end, and the tubes may be attached to the sill in any approved manner, or loosely held in connection therewith.

A roller A is journaled in the frame in front of the drills, which roller is preferably made hollow and of a cylindrical shape, and is keyed to a shaft 15, the ends whereof are journaled in the frame. The peripheral surface of the roller has formed thereon circumferential ribs 16, essentially triangular in cross-section. The ribs correspond in number with the number of drills employed, and each drill is immediately opposite a rib, as is best illustrated in Fig. 1.

In order to facilitate clearing the roller, should its efficacy become impaired by the adhesion of earth to its surface, a scraper-shaft 17, somewhat zigzag in shape, is journaled in the frame at one side of the roller, the said shaft being shaped to the contour of the roller and provided at one end with a crank-arm, whereby it may be readily manipulated.

Between the drills and the rear cross-beam of the frame a rock-shaft 18 is journaled, as best shown in Fig. 3. Upon this rock-shaft a series of cover-blades 19 is adjustably secured at their upper ends, one cover-blade being located immediately at the rear of each drill. The cover-blades are ordinarily made of sheet metal and are bent longitudinally at their centers in such manner that in cross-section they are slightly V-shaped, the concave surface of the blades being made to face the drills. The lower ends of the blades at their centers are provided with a slot or opening 20, whereby the said lower ends are made bifurcated, and the upper ends of the blades are formed to the contour of an eye 21, and the rock-shaft 18 passes through the said eyes.

The adjustment of the blades upon the rock-shaft is effected by producing a slot 22, preferably in the under surface of the eye of each blade and passing through the slots and into the shaft's binding-screws 23, as is illustrated in Figs. 1 and 3.

Preferably outside of the rear cross-beam 11 of the frame a second and parallel rock-shaft 24 is journaled, and a series of packing-wheels 25 is adjustably attached to the rock-shaft 24, one immediately at the rear of each of the cover-blades. Each packing-wheel is journaled in the lower bifurcated end of a shank 26, the upper end of each shank being formed into an eye, and the adjustment of the shanks upon the rock-shaft 24 is effected in like manner to the adjustment of the cover-blades upon the shaft 18.

In connection with the frame a hopper 27 is employed, which extends transversely from side to side of the frame at an elevation above the roller A, the said hopper being provided with standards 28 at each end, which standards are preferably detachably secured to the side beams of the frame, the retaining devices being screws, bolts, or their equivalent. The hopper is preferably longitudinally divided into two compartments B and B′ by a central partition 29, and the compartment B′, which is the rear compartment, is preferably deeper than the forward compartment B. If, however, in practice it is found desirable, the partition 29 may be omitted.

Each compartment of the hopper is provided with a series of slides 30, located upon the bottom, the outer ends of which slides extend rearward; and in connection with the slides any form of locking device may be employed. Each slide is made to entirely cover, or partially so, an opening 31 in the hopper-compartments. When two compartments are employed in the hopper, the slides of one compartment project rearward and the slides of the other compartment forward, as is best shown in Fig. 3.

Immediately beneath the bottom of each compartment in the hopper a shaft is journaled, extending through from side to side, the said shafts being designated in the drawings as 32 and 33, and beneath each opening in the hopper-compartments upon the shafts 32 and 33 a feed-wheel 34 is securely fastened. The feed-wheels are preferably provided with flanged end surfaces $a$, as best shown in Fig. 4, and two rows of peripheral teeth $a'$, the teeth of the rows being alternately arranged as is likewise best shown in Fig. 4, whereby each feed-wheel is made to partake of the form of a double spur-wheel having non-registering teeth.

A boxing or housing 35 is preferably located around each of the feed-wheels, the rear ends of the said housings being open and a portion of the bottom at said end. To each housing a conveyer-chute 36 is pivoted, and when the hopper is provided with two compartments, the upper chutes are made to enter the upper ends of the lower chutes, and the lower extremities of the said lower chutes slightly enter the flaring tops of the drills. When the hopper is provided with but a single compartment, but one feed-shaft is employed and one chute is used to convey the grain to each drill.

The feed-shafts are rotated from the roller-shaft in the following manner: A sprocket wheel or pulley 37 is secured to one projecting end of the roller-shaft, and a similar wheel 38 is secured upon the corresponding projecting end of the feed-shaft 33, while a like wheel 39 is loosely mounted upon the feed-shaft 32, the latter wheel being provided with a clutch-section $b$, adapted for engagement with a shifting-clutch $b'$ held to turn with the shaft 32, yet capable of sliding thereon. All of the sprocket wheels or pulleys 37, 38, and 39 are connected by a single chain belt 40. A lever 41 is secured at one end to one extremity of the rock-shaft 24, and the lever 41 is within convenient reach of the driver's seat 42, and is provided with the usual thumb-latch 43, adapted to engage with a suitable rack 44. From the corresponding end of the rock-shaft 18 an arm 45 is upwardly projected and pivotally connected with the lever 41 by a horizontal link 46, and upon a stud preferably projected from one rear standard of the lever an elbow-lever 47 is pivoted, one end of which lever is connected by a link 48 with the link 46 and arm 45 at their junction, and the opposite end of the lever is bifurcated and made to engage with the shifting-clutch $b'$, as illustrated in Figs. 1 and 2.

The flow of seed to the feed-wheel is regulated by moving the slides 30 in or out, thereby exposing more or less of the hopper-openings 31, and the seed is conveyed through the medium of the chutes 36 to the drills 14. As the implement is drawn forward the roller crushes or pulverizes the ground, and at the same time the ribs upon the roller form a furrow in the ground for the reception of the seed delivered thereto through the drills. The seeds in the furrows are covered by the cover-blades 19, which immediately follow the drills, and the earth is pressed down or rendered compact by the following packing-wheels 25. Either one of the compartments B or B′ may be brought into operation, or both may be used at once, as may be desired. The smaller compartment, however, is designed for the reception of such seed as "timothy," and the larger compartment for wheat or like grains.

The completed implement is usually made in two sections, each section being constructed as described, and the opposed side beams of the sections are united by a hinge C, as illustrated in Fig. 1, in which the two sections are shown as connected. A tongue D is attached to the front cross-beams of the sections in any suitable or approved manner.

The cover-blades and pressure or packing wheels may be made to travel deep or light upon the surface of the ground, as the character thereof may demand, and the hopper, drills, cover-blades, and packing-wheels may be detached from the frame and the roller be used alone, as occasion may demand.

Having thus described my invention, I claim as new and desire to secure by Letters Patent—

1. An implement of the character described, comprising a roller having a series of ribs on its periphery, said ribs being triangular in cross-section, drill-spouts in rear of the roller, cover-blades in rear of the drill-spouts, a packing-roller in rear of the covering blades, a hopper above the roller, seed-wheels mounted in the hopper and driven from the roller, and means for throwing the seed-wheels out of gear and for raising and lowering the covering-blades and packing-roller, substantially as herein shown and described.

2. In an implement of the character described, the combination, with a roller provided with a series of ribs forming furrow-openers, and drill-spouts in rear of the roller and opposite the ribs thereof, of a compartment-hopper above the roller, seed-wheels journaled in each compartment of the hopper, and chutes for conducting the seed from the wheels to the drill-spout, the upper chutes entering the lower chutes, substantially as described.

3. The combination, with a supporting-frame, a hopper on the frame, a shaft in the hopper and provided with a clutch, and seed-wheels on the shaft, of two rock-shafts journaled in the rear of the frame parallel with each other, covering-blades carried by one shaft, rollers carried by the other shaft, an operating-lever, and connections between the said lever, the shafts, and the clutch, substantially as and for the purpose set forth.

4. In an implement of the character described, the combination, with a frame, a roller journaled in said frame, having a series of circumferential ribs upon its outer face, and a drill located immediately at the rear of each of the roller-ribs, of a hopper above the roller provided with openings in its bottom, feed-wheels held to revolve beneath the hopper-openings, a chute pivoted beneath each feed-wheel, each chute being adapted to connect with one of the drills, a shaft journaled in the frame at the rear of the drills, and cover-blades adjustably secured upon said shaft, one cover-blade being located immediately behind each drill, substantially as shown and described.

5. In an implement of the character described, the combination, with a frame, a roller journaled in said frame provided with a series of circumferential ribs, a hopper supported above the roller provided with openings in its bottom, and slides capable of closing the said openings, of a drill located immediately at the rear of each rib of the roller, an adjustable cover-blade located at the rear of each drill, and an adjustable packing-wheel at the rear of each cover-blade, a feed-wheel located beneath each opening of the hopper, and a chute beneath each feed-wheel communicating with one of the drills, and a driving-connection between the feed-wheels and the roller, as and for the purpose specified.

HARVEY F. JONES.

Witnesses:
WM. A. ROBINSON,
ROBERT C. LAMBE.